United States Patent
Kawahara (10) Patent No.: US 7,460,154 B2
(45) Date of Patent: Dec. 2, 2008

(54) VIBRATION COMPENSATION APPARATUS USING A COORDINATE CONVERSION

(75) Inventor: Hideo Kawahara, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 677 days.

(21) Appl. No.: 10/733,425

(22) Filed: Dec. 10, 2003

(65) Prior Publication Data

US 2004/0125213 A1 Jul. 1, 2004

(30) Foreign Application Priority Data

Dec. 13, 2002 (JP) ............................. 2002-361836

(51) Int. Cl.
*H04N 5/228* (2006.01)

(52) U.S. Cl. ............... 348/208.2; 348/208.4; 348/352; 348/413.1; 348/155

(58) Field of Classification Search ............ 348/154, 348/155, 208.1, 208.2, 208.4, 208.13, 208.16, 348/352, 402.1, 413.1, 416.1, 416

See application file for complete search history.

(56) References Cited

U.S. PATENT DOCUMENTS

| | | | | |
|---|---|---|---|---|
| 5,585,875 A | * | 12/1996 | Imafuji et al. | 396/55 |
| 5,623,705 A | * | 4/1997 | Ohishi et al. | 396/55 |
| 5,634,145 A | * | 5/1997 | Ohishi et al. | 396/55 |
| 5,664,243 A | * | 9/1997 | Okada et al. | 396/246 |
| 5,867,213 A | * | 2/1999 | Ouchi | 348/208.5 |
| 5,923,368 A | * | 7/1999 | Hirasawa | 348/207.99 |
| 5,982,421 A | * | 11/1999 | Inou et al. | 348/208.5 |
| 5,986,698 A | * | 11/1999 | Nobuoka | 348/208.3 |
| 6,198,504 B1 | * | 3/2001 | Nobuoka | 348/208.3 |
| 6,343,188 B1 | * | 1/2002 | Morofuji | 396/55 |

FOREIGN PATENT DOCUMENTS

JP 07-261227 4/1997

OTHER PUBLICATIONS

Japanese Office Action dated Jun. 3, 2008 for Japanese Application No. 2002-361836.

* cited by examiner

*Primary Examiner*—David L Ometz
*Assistant Examiner*—Usman Khan
(74) *Attorney, Agent, or Firm*—Morgan & Finnegan, L.L.P.

(57) ABSTRACT

A vibration compensation apparatus comprises: an angular velocity detector that detects a plurality of angular velocities in two orthogonal detection axes directions and outputs corresponding angular velocity signals; a compensation unit that compensates vibration in a plurality of compensation axis directions; and a conversion unit that converts the plurality of angular velocity signals obtained by the angular velocity detector or a plurality of vibration compensation signals based on the plurality of angular velocity signals into vibration compensation signals expressed in the coordinates of the compensation axes of the compensation unit. The compensation unit compensates the vibration based on the vibration correction signals converted by the conversion unit.

7 Claims, 8 Drawing Sheets

VIBRATION COMPENSATION APPARATUS USING A COORDINATE CONVERSION

FIELD OF THE INVENTION

The present invention relates to a vibration compensation apparatus, preferably used in, inter alia, an image sensing apparatus, for compensating vibration caused by uncontrollable hand movements or the like affected on an apparatus to which the vibration compensation apparatus is mounted.

BACKGROUND OF THE INVENTION

Conventional image sensing apparatus, such as a video cameras, have been automated and equipped with variety of functions including auto exposure (AE) functions and auto focus (AF) functions, which make it easy to obtain an image of good quality.

Further, an image sensing apparatus has been down-sized and its optical system has achieved a high magnification. At the same time, because of these developments, vibration of an image sensing apparatus became a major cause of degradation of a sensed image. To overcome this vibration problem, a variety of types of vibration compensation functions for compensating blur in a sensed image due to vibration (e.g., shaking of hands) of an image sensing apparatus have been proposed. By equipping such vibration compensation function in an image sensing apparatus, a better image can be easily obtained.

A compensation apparatus equipped with this kind of vibration compensation function that detects vibration of the apparatus based on information from an angular velocity sensor, acquires a vibration compensation signal by processing the detected vibration, and optically or electrically compensates the blur in a sensed image affected by, for example, uncontrollable hand movements.

Conversely, angular velocity sensors have also been downsized along with the recent down-sizing of image sensing apparatus. It is proposed to package two sensors into one sensor to further achieve down-sizing.

If the two sensors are packaged into one sensor, although the volume of the sensor is reduced, freedom of a mount position of the sensor is limited. More specifically, since axes (vibration detection axes, or detection axes) of two angular velocity sensors have to be orthogonal, the packaged sensor has to be mounted on a predetermined plane and the detection axes are required to be more precisely aligned so as to be parallel to corresponding compensation axes.

Figure 8A:
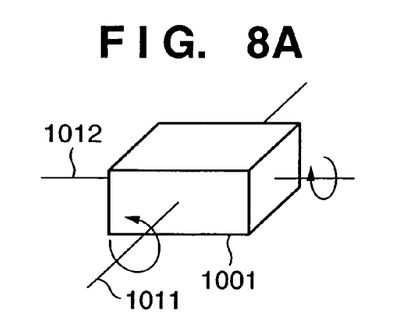
FIGS. 8A and 8B are explanatory views for explaining an arrangement of an angular velocity detector.

The aforesaid problem will be explained in more detail with reference to FIGS. 8A and 8B. In FIG. 8A, reference numeral 1001 denotes an angular velocity detector having two angular velocity detection axes. Reference numerals 1011 and 1012 respectively denote the angular velocity detection axes.

Figure 8B:
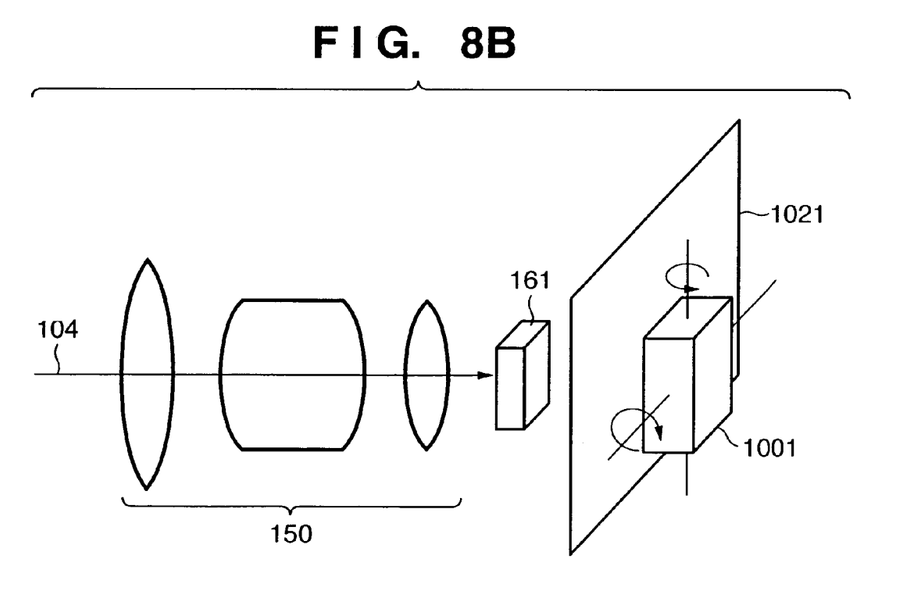

The angular velocity detector 1001 has to be laid out on a plane 1021 which is orthogonal to an optical axis 104 of an image sensing optical system 150 as shown in FIG. 8B, since the angular velocity detection axes 1011 and 1012 have to be orthogonal to the optical axis 104.

Further, although it is not shown in FIGS. 8A and 8B, a typical vibration compensation unit for compensating vibration of image sensing apparatus also has two axes (compensation axes) which correspond to the two detection axes 1011 and 1012, and it is necessary to align the angular velocity detector 1001 and the vibration compensation unit so that the detection axes 1011 and 1012 match the corresponding compensation axes.

Thus, freedom of layout of the angular velocity detector 1001 is more limited than arranging two sensors individually.

SUMMARY OF THE INVENTION

The present invention has been made in consideration of the above situation, and has as its object to lower restrictions in mounting an angular velocity detector which detects angular velocities along two orthogonal detection axes.

According to the present invention, the foregoing object is attained by providing a vibration compensation apparatus comprising:

an angular velocity detector that detects a plurality of angular velocities in two orthogonal detection axes directions, and outputs corresponding angular velocity signals;

a compensation unit that compensates vibration in a plurality of compensation axis directions; and a conversion unit that converts the plurality of angular velocity signals obtained by the angular velocity detector or a plurality of vibration compensation signals based on the plurality of angular velocity signals into vibration compensation signals expressed in the coordinates of the compensation axes of the compensation unit, wherein the compensation unit compensates the vibration based on the vibration correction signals converted by the conversion unit.

According to the present invention, the foregoing object is also attained by providing a vibration compensation method using an angular velocity detector which detects a plurality of angular velocities in two orthogonal detection axes directions, and outputs angular velocity signals, and a compensation unit which compensates vibration in a plurality of compensation axis directions, comprising:

converting the plurality of angular velocity signals obtained by the angular velocity detector or a plurality of vibration compensation signals based on the plurality of angular velocity signals into vibration compensation signals expressed in the coordinates of the compensation axes of the compensation unit; and compensating the vibration by controlling the compensation unit based on the converted vibration compensation signals.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
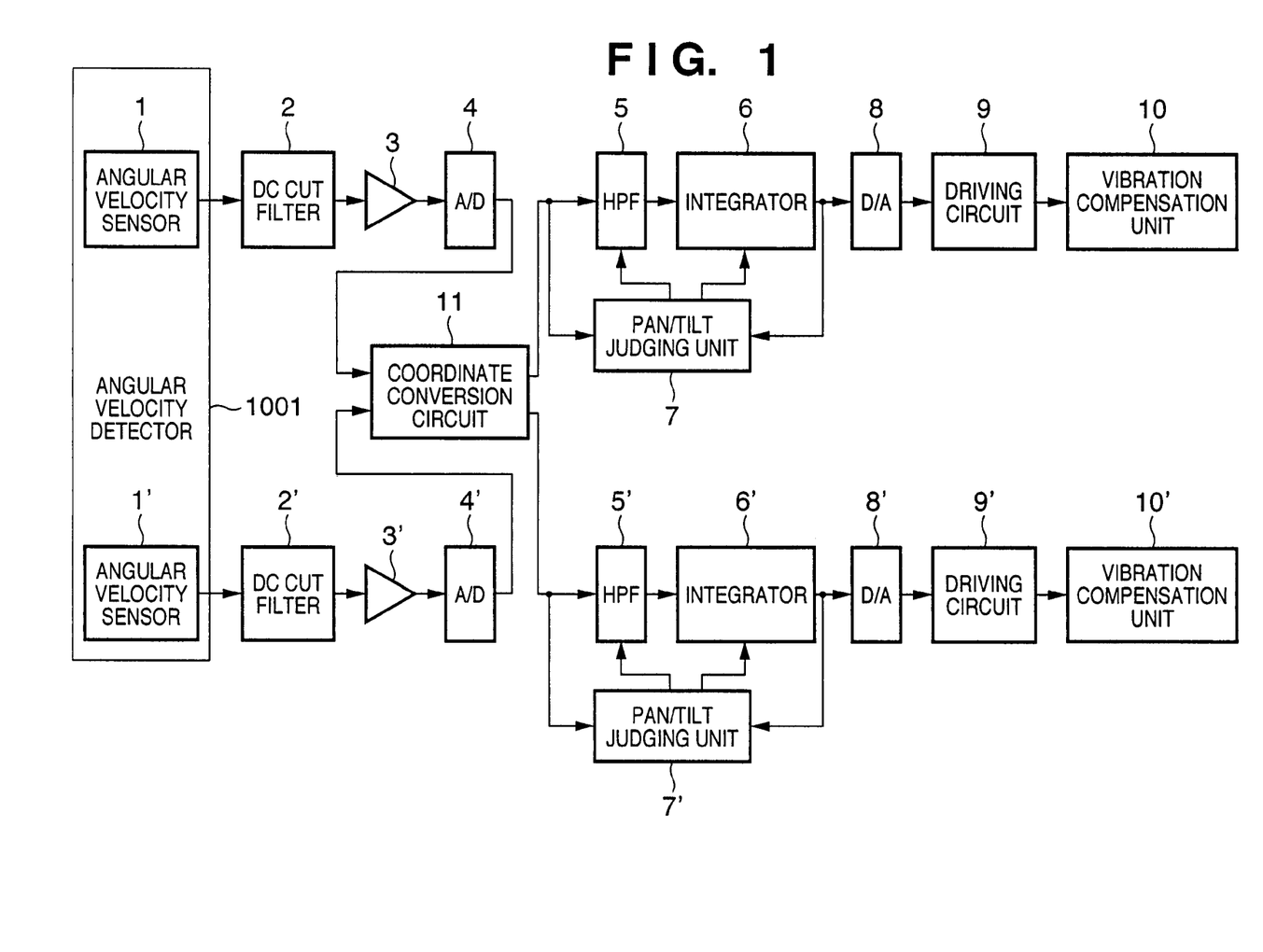
FIG. 1 is a block diagram of an image sensing apparatus according to a first embodiment of the present invention.

FIG. 1 shows a configuration of an image sensing apparatus according to an first embodiment of the present inventions. In the first embodiment, after an angular velocity signals are corrected by a coordinate conversion circuit for inclination amounts of an angular velocity detection axes with respect to vibration compensation axes, vibration compensation processing is performed.

Referring to FIG. 1, reference numeral 1001 denotes an angular velocity detector having two orthogonal angular velocity axes and comprising angular velocity sensors such as, inter alia, vibration gyros. Two angular velocity sensors 1 and 1' are packaged in the angular velocity detector 1001, with the angular velocity detection axes of the angular velocity sensors 1 and 1' being orthogonal to each other. The angular velocity detector 1001 is mounted on an image sensing apparatus main body, such as a camera, which has a vibration compensation function to detect vibration of the apparatus as angular velocities, in such a manner that the two angular velocity detection axes are orthogonal to an optical axis of the image sensing apparatus.

Reference numerals 2 and 2' denote DC cut filters which cut direct current (DC) components of the angular velocity signals outputted from the angular velocity sensors 1 and 1', and pass alternate current (AC) components, i.e., the vibration components. As the DC cut filters 2 and 2', high-pass filters (HPF) which cut signal components having frequencies less than a predetermined frequency may be used.

Reference numerals 3 and 3' denote amplifiers which amplify the angular velocity signals outputted from the DC cut filters 2 and 2' to proper signal levels and output them.

Reference numerals 4 and 4' denote A/D converters which convert the analog angular velocity signals outputted from the amplifiers 3 and 3' into digital signals and output them.

Reference numeral 11 denotes a coordinate conversion circuit which corrects errors caused by discrepancy in alignment between the detection axes of the angular velocity detector 1001 and compensation axes of vibration compensation units 10 and 10'. The details of the coordinate conversion circuit 11 will be described later.

Reference numerals 5 and 5' denote HPFs capable of changing their cut-off frequencies within an arbitrary frequency band. The HPFs 5 and 5' cut low frequency components included in the digital angular velocity data outputted from the A/D converters 4 and 4', and output the result.

Reference numerals 6 and 6' denote integrators capable of changing their characteristics within an arbitrary frequency band. The integrators 6 and 6' integrate angular velocity data respectively outputted from the HPFs 5 and 5' and output the integrated values as angular displacement data.

Reference numerals 7 and 7' denote pan/tilt judging units which judges panning and tilting operations on the basis of the angular velocity data outputted from the A/D converters 4 and 4' and the angular displacement data outputted from the integrators 6 and 6'. The pan/tilt judging units 7 and 7' then perform panning or tilting control as described below in accordance with the levels of the angular velocity data and the angular displacement data.

If the angular velocity data is equal to or larger than a predetermined threshold value, or if the angular displacement data, that is the integrated value of the angular velocity data, is equal to or larger than a predetermined value when the angular velocity data is smaller than the predetermined threshold, the pan/tilt judging units 7 and 7' determine that panning or tilting is in progress, and perform panning or tilting control.

In the panning or tilting control, the cut-off frequencies of the HPFs 5 and 5' are shifted to higher frequencies to change their characteristics so that the vibration compensation systems of the vibration compensation units 10 and 10' do not respond to low frequency components. Then, time constants which determine the integration characteristics of the integrators 6 and 6' are gradually decreased, thereby the vibration compensation positions of the vibration compensation units 10 and 10' are gradually move to the center of a moving areas. Thus, the values of the angular displacement data accumulated in the integrators 6 and 6' gradually approach reference values (values which can be obtained when no vibration is detected).

The collection of the angular velocity data and the angular displacement data is continued during the panning or tilting control is performed, and when the panning and/or tilting ends (namely, when both of the angular velocity data and the angular displacement data become smaller than the respective threshold values), the cut-off frequencies of the HPFs 5 and 5' are shifted to lower frequencies, and the time constants used for integration operation in the integrators 6 and 6' are increased, thereby widening a vibration compensation range. Thus, the cut-off frequencies of the HPFs 5 and 5' and the time constants of the integrators 6 and 6' are reset to the original values, and the panning or tilting control is stopped.

Reference numerals 8 and 8' denote D/A converters which convert the angular displacement data outputted from the integrators 6 and 6' into analog signals and output them.

Reference numerals 9 and 9' denote driving circuits which drives the vibration compensation units 10 and 10' so as to compensate the vibration on the basis of the analog angular displacement signals outputted from the D/A converters 8 and 8'.

Reference numerals 10 and 10' denote the vibration compensation units, and, inter alia, an optical compensation mechanism which cancels out vibration by shifting the optical axis is used. The optical compensation mechanism has an optical vibration compensation system using, inter alia, a variable apical angle prism (VAP), and changes the apical angle of the VAP driven by the driving circuits 9 and 9' to shift the optical axis of incident light on an image sensing surface, thereby optically compensates vibration on a sensed image.

Figure 2A:
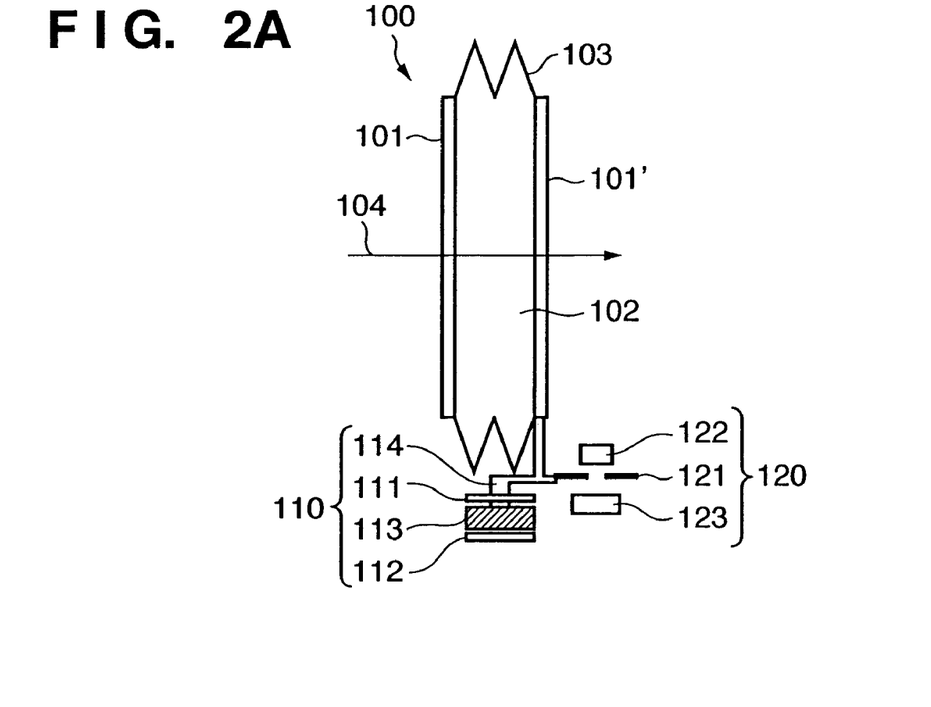
FIGS. 2A and 2B show an example of a vibration compensation unit.
Figure 2B:
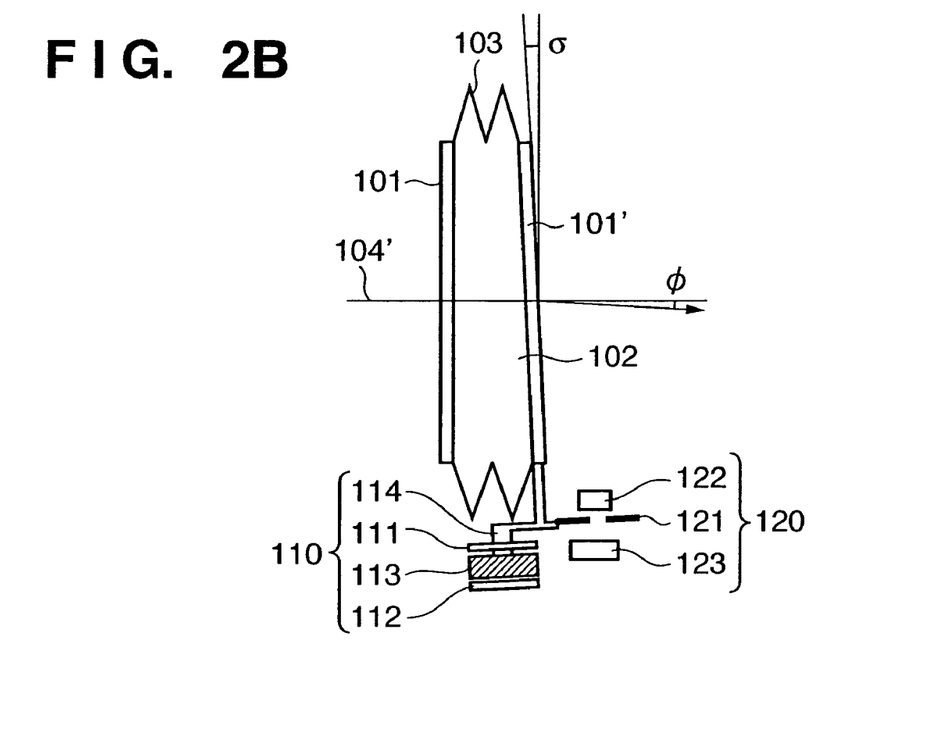

FIGS. 2A and 2B are explanatory views for explaining an example of the vibration compensation units 10 and 10' shown in FIG. 1. In the example shown in FIGS. 2A and 2B, a variable apical angle prism (VAP) 100 is used and a voice coil type actuator 110 is used as a driving system, and the changed amount of the apical angle of the VAP 100 is detected by an encoder 120. The detected result of the encoder 120 is fed back to the actuator 110 the driving system, thereby a control system which configures a closed loop for controlling the driving amount of the VAP 100 is realized.

First, the VAP 100 will be described in detail. In the configuration of the VAP 100 shown in FIGS. 2A and 2B, reference numerals 101 and 101' denote plane glasses facing to each other; 102, a high-refractive material comprising transparent elastic body or non-active liquid having high-refractive characteristics (index of refraction: n); and 103, a sealer, such as a resin film, for elastically encapsulating and sealing the high-refractive material 102 from its periphery. The sealer 103 which encapsulates and seals the high-refractive material 102 is supported by the plane glasses 101 and 101'. Reference numeral 104 shown in FIG. 2A denotes a path of light which is orthogonally incidents on the plane glass 101, passes through the high-refractive material 102, and exits from the plane glass 101'.

FIG. 2A shows a state in which the pair of plane glasses 101 and 101' are held in parallel. In this state, the light path 104 is orthogonally incident on the plane glass 101, passes through the high-refractive material 102, then orthogonally exit from the plane glass 101'.

In contrast, FIG. 2B shows a state in which the plane glass 101' is tilted by the voice coil type actuator 110. In this state, the optical axis is bent, and an optical prism is formed by the pair of plane glasses 101 and 101' and the high-refractive material 102. Therefore, the path 104' of light which is orthogonally incident on the plane glass 101 is refracted when the light exits from the plane glass 101' comparing to the light path 104 when the plane glasses 101 and 101' are parallel as shown in FIG. 2A.

Referring to FIG. 2B, the state of light path 104' when the plane glass 101' of the VAP 100 is tilted by an angle $\sigma$ with respect to the plane glass 101 is explained in more detail. The light which is orthogonally incident on the plane glass 101 is refracted by an angle $\phi = (n-1)\sigma$ and outputted as indicated by the light path 104'. The refraction angle is derived based on the same principle of a wedge shaped prism. In other words, the light path 104' bends by the angle $\phi$. It is assumed that the index of refraction n is close to that of a glass.

Figure 3:
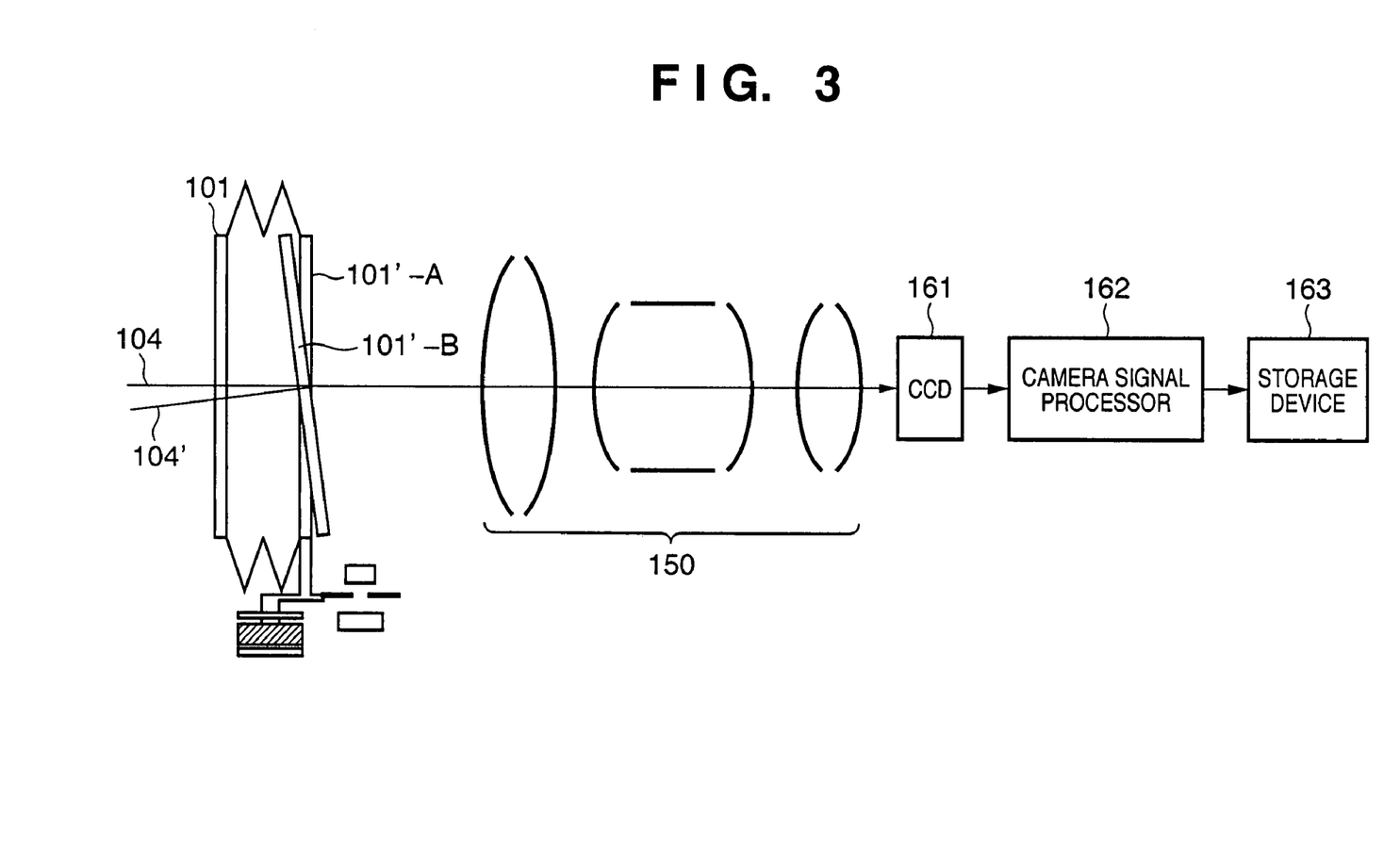
FIG. 3 is an explanatory view for explaining shifting of an optical axis for vibration compensation when a variable apical angle prism is used.

Next, correction of the optical axis when the above-described VAP 100 is used is explained with reference to FIG. 3. In FIG. 3, 101'-A shows a state where the plane glass 101' is parallel to the plane glass 101 (the state shown in FIG. 2A), and 101'-B shows a state where the plane glass 101' is tilted with respect to the plane glass 101 (the state shown in FIG. 2B).

Reference numeral 150 denotes an image sensing optical system; 161, an image sensing device, such as a CCD, which photoelectrically converts incident light into electric signals and outputs them; 162, a camera signal processor which converts the electric signals output from the image sensing device 161 into image signals conforming to, for instance, NTSC standards; and 163, a storage device for storing the image signals.

In the state 101'-A in which the plane glass 101' is parallel to the plane glass 101 as shown in FIG. 3, the light path 104 goes straight to an image forming surface of the image sensing device 161 through the image sensing optical system 150.

In contrast, in the state 101'-B in which the plane glass 101' is tilted with respect to the plane glass 101, the apical angle formed by the pair of plane glasses 101 and 101' is changed, which causes the change of the light path 104 to the light path 104'. The bent light path 104' is formed on the image forming surface of the image sensing device 161 as in the case of state 101'-A via the image sensing optical system 150.

As described above, shift of the object (shift of the optical axis) due to vibration of the image sensing apparatus can be optically compensated.

Next, the actuator 110 is explained with reference to FIGS. 2A and 2B. In the structure of the actuator 110 shown in FIGS. 2A and 2B, reference numeral 111 denotes a yoke; 112, a magnet; 113, a coil; and 114, an arm which transmits driving torque. With this configuration, a voice coil type actuator capable of changing the apical angle of the VAP 100 by supplying electric current to the coil 113 is formed.

In the structure of the angular displacement encoder 120 for detecting a tilt (displacement of the apical angle, namely, angular displacement) of the plane glass 101' of the VAP 100, reference numeral 121 denotes a slit for detecting the angular displacement of the VAP 100, which is coupled with the arm 114 of the actuator 110 and rotates as the plane glass 101' of the VAP 100 tilts, thus the position of the slit 121 moves. Reference numeral 122 denotes a light emit diode (LED); 123, a position sensing detector which detects the position of the slit 121 in cooperation with the LED 122, thereby the displacement of the apical angle of the VAP 100 is detected.

Figure 4:
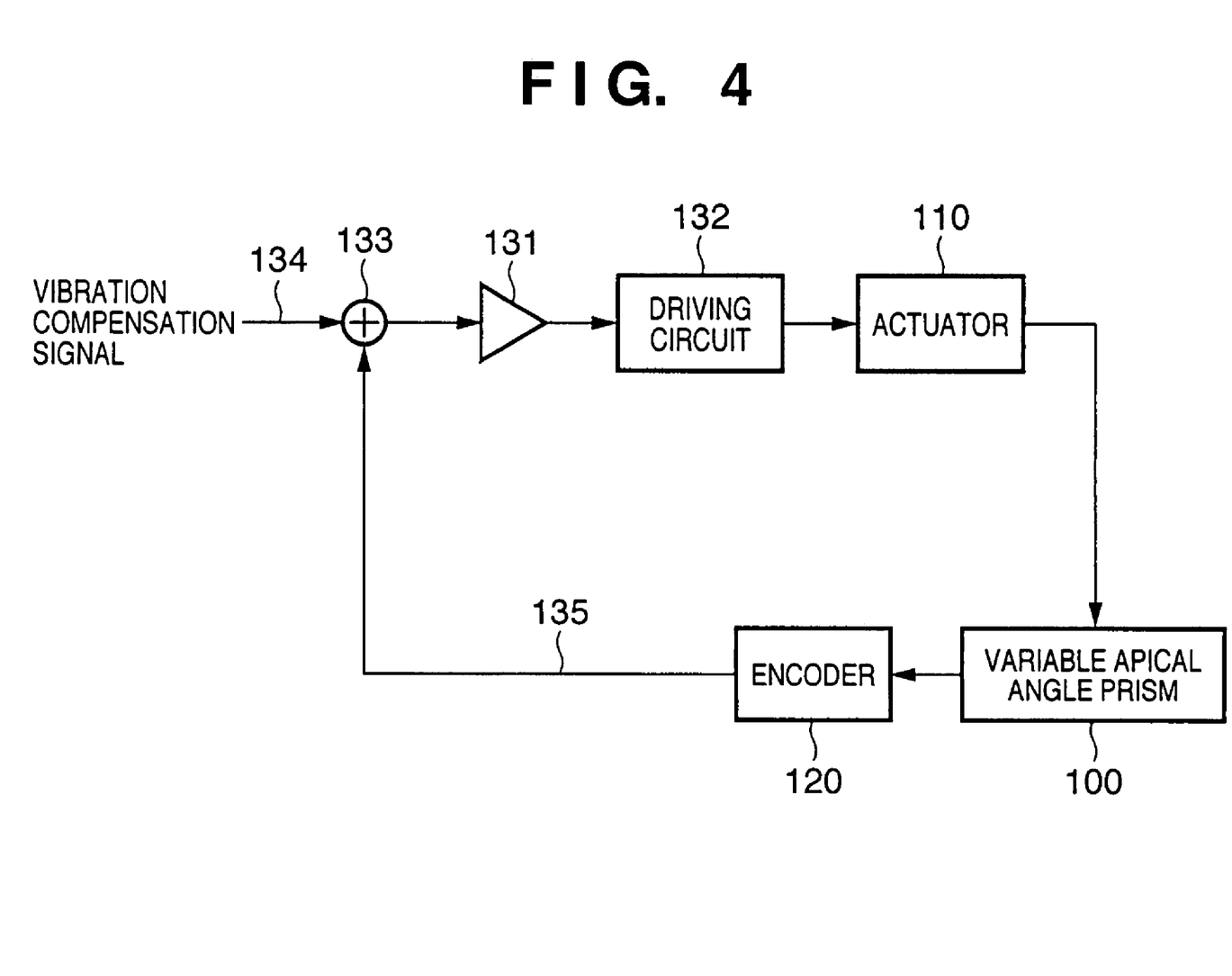
FIG. 4 is a block diagram showing a basic structure of a control circuit for driving and controlling the variable apical angle prism.

Next, a basic structure and operation of the control circuit for controlling and driving the VAP 100 are explained with reference to a block diagram shown in FIG. 4. In FIG. 4, reference numeral 131 denotes an amplifier; 132, a driving circuit for driving the actuator 110 based on the output from the amplifier 131; and 133, an adder which adds a vibration compensation signal (angular displacement signal) 134 and a angular displacement signal 135 outputted from the angle change encoder 120 after changing the sine of one of the two signals, and outputs the sum to the amplifier 131.

The control system having the foregoing configuration operates so that the vibration compensation signal 134 obtained by the configuration as described above and the angular displacement signal 135 outputted from the encoder 120 become equal. Therefore, the VAP 100 is driven so that the vibration compensation signal 134 matches the angular displacement signal 135, and the plane glass 101' of the VAP 100 is controlled to move to a control target position (i.e., to make a control target apical angle).

Although it is not shown in FIG. 4 for the simplicity sake of the figure, another set of driving circuit, encoder, and control circuit having the same functions as those described above are provided in the direction perpendicular to the driving direction of the VAP 100, thereby correction in the right-left direction can be realized in addition to the correction in the up-down direction as described above in accordance with the vibration detection signals in the right-left and up-down directions with respect to the optical axis.

Figure 5A:
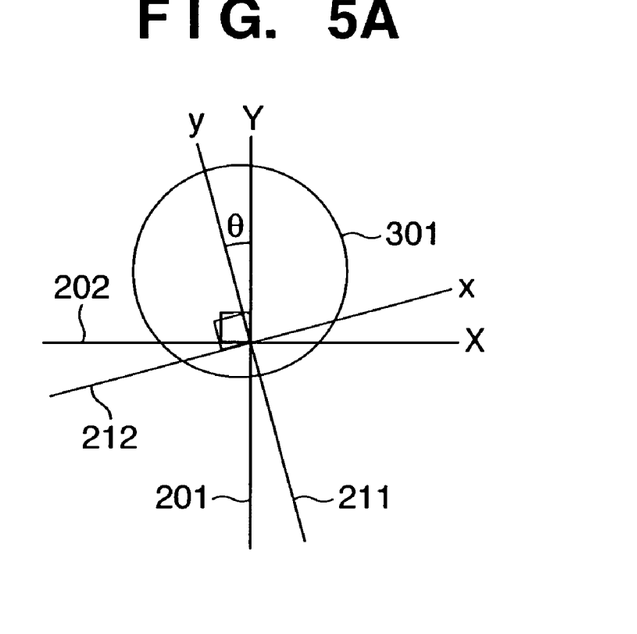
FIGS. 5A and 5B are explanatory views for explaining conversion operation from a detection coordinate system to a compensation coordinate system according to the first embodiment of the present invention.
Figure 5B:
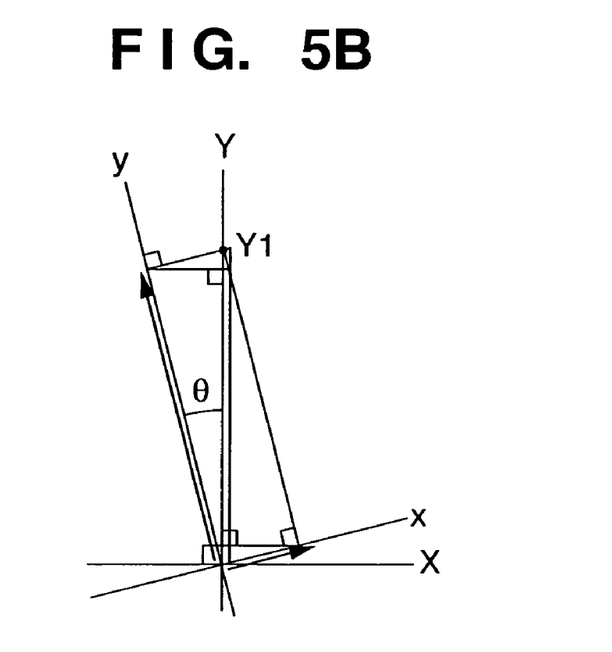

Next, conversion operation performed by the coordinate conversion circuit 11 is explained with reference to FIGS. 5A and 5B. In FIG. 5A, axes 201 and 202, arranged perpendicular to each other, are of the vibration compensation system (referred to as "compensation axes" hereinafter). The arrangement of the compensation axes 201 and 202 correspond to the arrangement of the vibration compensation units 10 and 10' as described above, and indicates that the vibration compensation unit 10' is arranged to make 90 degrees with the vibration compensation unit 10.

Axes 211 and 212, arranged perpendicular to each other, are axes of the angular velocity sensors 1 and 1' (referred to as "detection axes" hereinafter).

Respective axes indicate vibration detection amount and vibration compensation amount, and vibration can be compensated by making a vibration correction vector equal to a vibration compensation vector.

The detection axes 211 and 212 are arranged so as to substantially match the compensation axes 201 and 202. The angular velocity signal detected in the direction of the detection axis (y) 211 undergoes the aforedescribed process, then the vibration is compensated by the vibration compensation unit 10 having the compensation axis (Y) 201 based on the processed angular velocity signal.

Assume that the angular velocity detector 1001 and the vibration compensation units 10 and 10' are fixed to the image sensing apparatus with the detection axes 211 and 212 and the compensation axes 201 and 202 making an angle θ as shown in FIG. 5A. In such case, it would be understood that it causes a compensation error if the vibration compensation units 10 and 10' are operated using vibration compensation signals, which are detected in the coordinates of the detection axes and then has undergone merely conventional signal processing, because a vector expressed in the coordinate system of the vibration detection axes 211 and 212 do not match a vector expressed in the coordinate system of the compensation axes 201 and 202.

The coordinate conversion circuit 11 is provided for canceling the compensation error, and performs the following vector conversion operation to convert input angular velocity signals "x" and "y" to compensation signals "X" and "Y". This vector conversion operation realizes proper vibration compensation.

$$X = x \cos θ - y \sin θ \quad (1)$$

$$Y = y \cos θ + x \sin θ \quad (2)$$

θ indicates a tilt angle of the detection axes with respect to the compensation axes, and positive in the clockwise direction and negative in the counter-clockwise direction.

Next, the foregoing operations are described in more detail with reference to FIG. 5B. FIG. 5B is an enlarged view of a part 301 shown in FIG. 5A, and the detection axes 211 and 212 are tilted by θ degrees with respect to the compensation axes 201 and 202 as described above.

Assume that pitch (vibration in the vertical direction) Y1 is applied to the image sensing apparatus. A scalar part of a vibration detection vector y in the pitch direction of the angular velocity sensor 1 mounted with the angle θ, namely the angular velocity signal y, is expressed as follows:

$$y = Y1 \cos θ$$

Similarly, a scalar part of the vibration detection vector x in the yaw direction of the angular velocity sensor 1', namely the angular velocity signal x, is expressed as follows:

$$x = Y1 \sin θ$$

In order to obtain vibration compensation amounts from the detected vibration amounts, a Y axis component of the detection vector y in the pitch direction and the a Y axis component of the detection vector x in the yaw direction are to be added.

The Y axis component of the vibration detection vector y in the pitch direction, yP, is expressed as follows:

$$yP = y \times \cos θ = Y1 \cos^2 θ$$

The Y axis component of the vibration detection vector x in the yaw direction, xP, is expressed as follows:

$$xP = x \times \sin θ = Y1 \sin^2 θ$$

A Y axis component Ph1 of the vibration correction vectors y and x is the sum of above, thus, $$Ph1 = yP + xP \quad (3)$$
$$= y\cos θ + x\sin θ$$

is obtained. This is the same as the equation (2).

In the above described case, Ph1 = Y1 is known, thus, $$Ph1 = yP + xP$$
$$= Y1(\cos^2 θ + \sin^2 θ)$$
$$= Y1$$

This proves that the equation (3) is correct.

Similarly, a vibration compensation vector Yh1 in the yaw direction of the compensation axes 202 is obtained in accordance with the following equation (4). In the example shown in FIG. 5B, the direction of an X component of the vector y is negative in the X-Y coordinate system, it is dealt as a negative component in the scalar operation. Therefore, the following equation is obtained:

$$Yh1 = -y \sin θ + x \cos θ \quad (4)$$

Thus, the same equation as equation (1) is obtained.

By performing the operation expressed by the equations (1) and (2) by the coordinate conversion circuit 11, it is possible to correct the error caused by the discrepancy in alignment between the detection axes 211 and 212 of the angular velocity sensors 1 and 1' and the compensation axes 201 and 202 of the vibration compensation units 10 and 10'.

As described above, when an angular velocity detector which detects angular velocities in the two perpendicular detection axes direction is used, if the angular velocity detector is tilted on a mounted plane with respect to a vibration compensation system, it is possible to correct the error caused by the tilt. Thus, requirement for mounting the angular velocity detector can be loosened.

The tilted angle θ between the detection axes and the compensation axes can be obtained by mechanically measuring the angle. As for another method of obtaining the angle θ, let the output from one gyro sensor obtained when an angular velocity α is applied to a compensation axis corresponding to the other gyro sensor be β, then the value β can be obtained by the following equation:

$$β = α \sin θ$$

wherein θ is the tilted angle between the vibration detection unit and the vibration compensation unit.

The tilted angle θ may be stored in a storage unit within the coordinate conversion circuit 11.

Further, the vibration compensation unit according to the embodiment is assumed to be an optical correction unit, however, the present invention is not limited to this. A so-called electronic vibration compensation system that compensates the vibration affecting a sensed image by controlling read out timing of the image sensing device may be used instead.

Alternatively, a system which compensates the vibration by controlling image write/read timing of a sensed image to/from a memory when the image output from an image sensing device is read out to the memory may be used.

Second Embodiment

Figure 6:
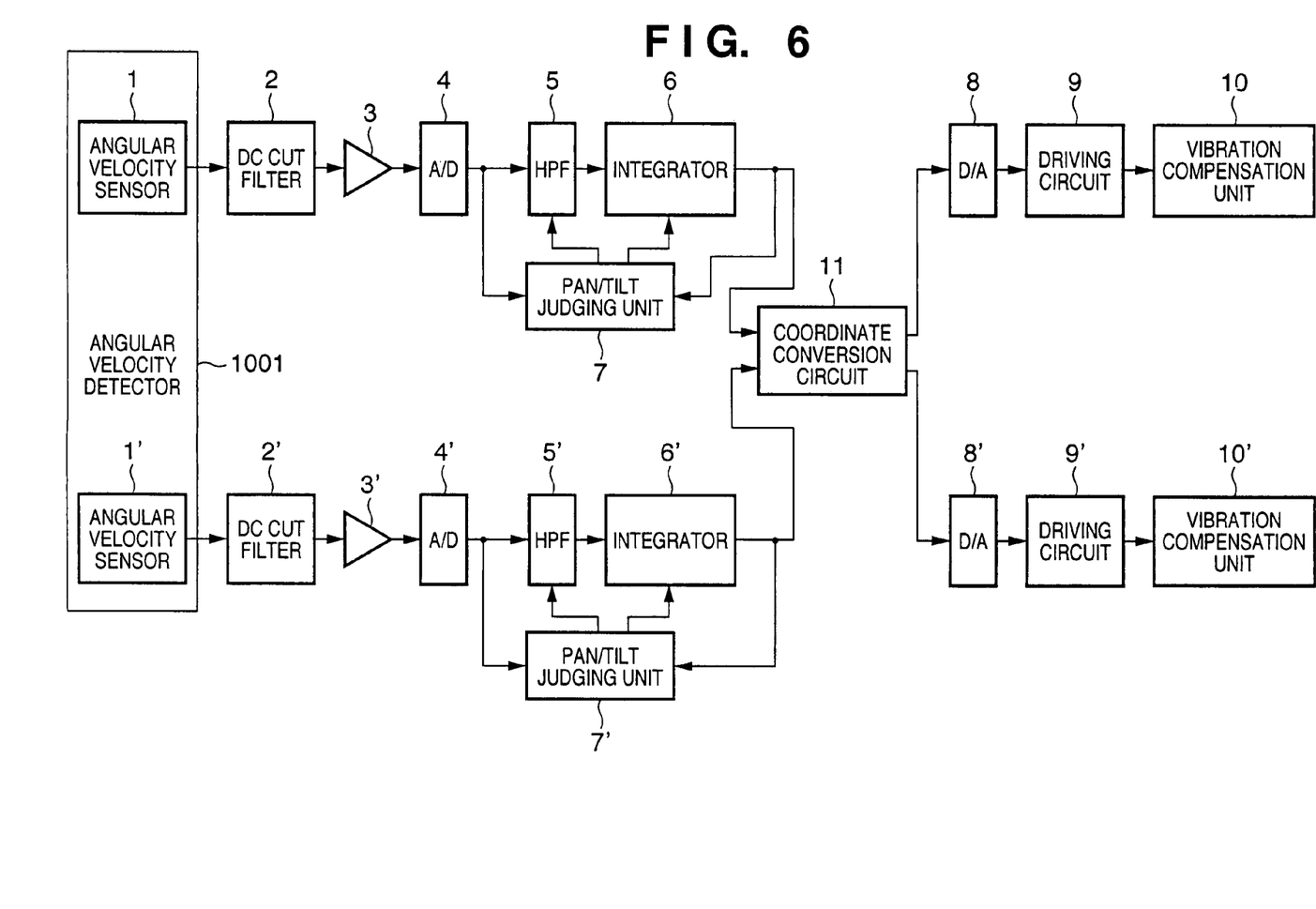
FIG. 6 is a block diagram of an image sensing apparatus according to a second embodiment of the present invention.

FIG. 6 shows the configuration of an image sensing apparatus according to the second embodiment of the present invention. In FIG. 6, the same elements as those shown in FIG. 1 are referred to by the same reference numerals, and explanations are omitted.

As shown in FIG. 6, the coordinate conversion circuit 11 is arranged in the downstream of the integrators 6 and 6'. By arranging in this manner, a dynamic range of a signal required by the coordinate conversion circuit 11 can be narrower than that required in the arrangement of the first embodiment, it is possible to reduce the data length to be dealt with by the coordinate conversion circuit 11. This is due to an operation of the pan/tilt judging units 7 and 7', and the characteristics of the HPFs 5 and 5' are changed in accordance with the panning or tilting control as described above, and the values accumulated in the integrator 6 and 6' are limited. Therefore, by arranging as described in FIG. 6, it is possible to shorten the data length to be dealt with by the coordinate conversion circuit 11, thereby improving the operation processing speed.

Third Embodiment

Figure 7:
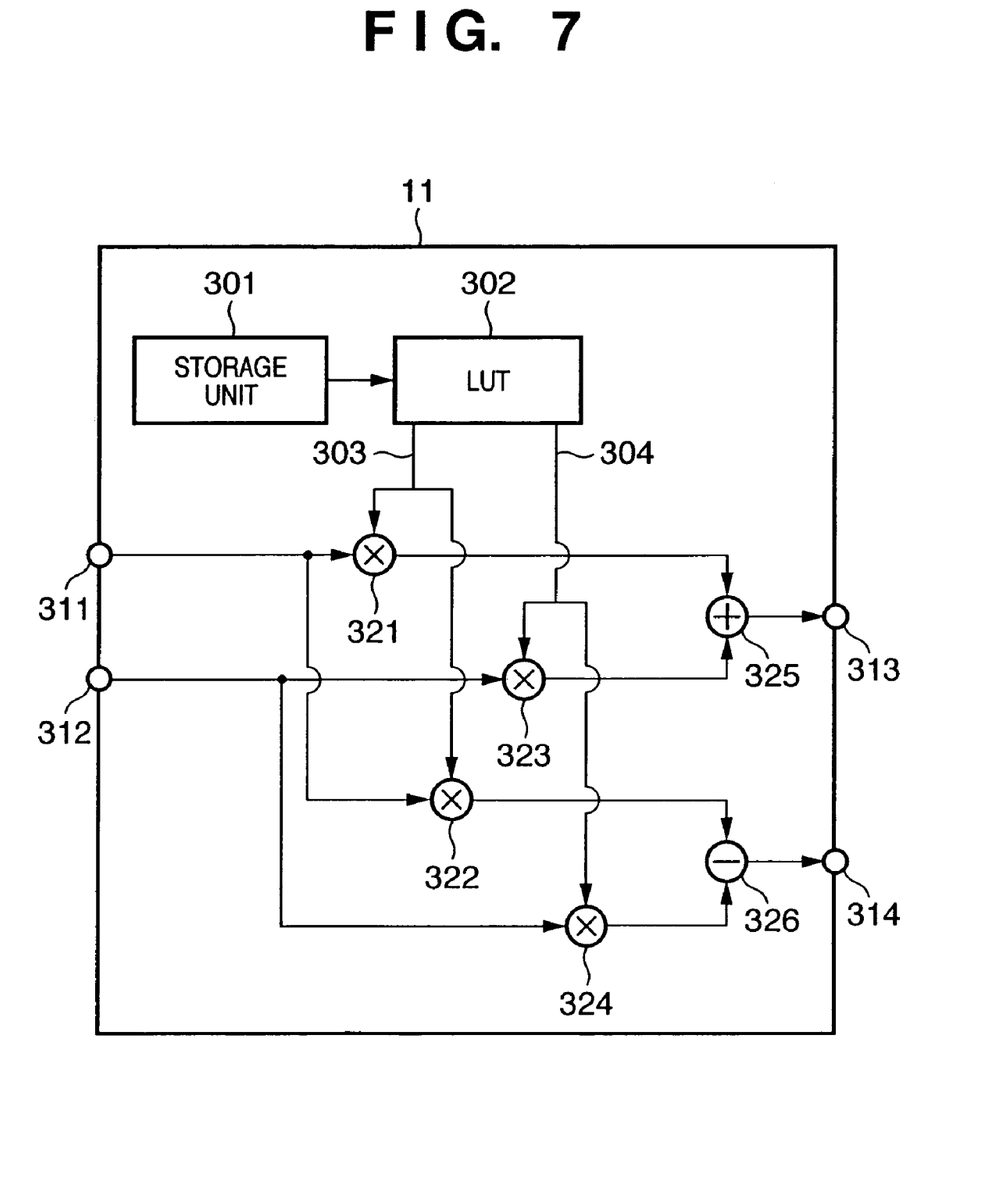
FIG. 7 shows an example of a configuration of a coordinate conversion circuit.

In the third embodiment, an example that an operation performed in the coordinate conversion circuit 11 is simplified is explained with reference to FIG. 7. FIG. 7 is a block diagram showing an internal configuration of the coordinate conversion circuit 11. Reference numerals 311 and 312 are input terminals of vibration detection signals, and angular velocity signals which are multiplied by predetermined values are inputted.

Reference numerals 313 and 314 are output terminals of vibration compensation signals, and signals undergone the coordinate conversion (tilted amount correction) described in the first embodiment are outputted.

Reference numeral 301 denotes a storage unit such as a memory; and 302 a look-up table (LUT). The storage unit 301 stores address data indicative of addresses of the data stored in the LUP 302. LUT 302 outputs the data corresponding to the address stored in the storage unit 301. In the third embodiment, it is assumed that data is arranged in two columns, and thus data 303 and 304 are simultaneously outputted.

The data is arranged such that values of sin θ and cos θ are stored in pairs for the respective θ. For example, different addresses are assigned to the different angles, and each address contains a result of the sine operation in data column 1 and a result of the cosine operation in data column 2 as in the following table 1.

TABLE 1

| Address | Angle(degrees) | sin | cos |
|---|---|---|---|
| 0 | −10 | −0.174 | 0.985 |
| 1 | −9 | −0.156 | 0.988 |
| 2 | −8 | −0.139 | 0.990 |
| 3 | −7 | −0.122 | 0.993 |
| 4 | −6 | −0.105 | 0.995 |
| 5 | −5 | −0.087 | 0.996 |
| 6 | −4 | −0.070 | 0.998 |
| 7 | −3 | −0.052 | 0.999 |
| 8 | −2 | −0.035 | 0.999 |
| 9 | −1 | −0.017 | 1.000 |
| 10 | 0 | 0.000 | 1.000 |
| 11 | 1 | 0.017 | 1.000 |
| 12 | 2 | 0.035 | 0.999 |
| 13 | 3 | 0.052 | 0.999 |
| 14 | 4 | 0.070 | 0.998 |
| 15 | 5 | 0.087 | 0.996 |
| 16 | 6 | 0.105 | 0.995 |
| 17 | 7 | 0.122 | 0.993 |
| 18 | 8 | 0.139 | 0.990 |
| 19 | 9 | 0.156 | 0.988 |
| 20 | 10 | 0.174 | 0.985 |

Referring to FIG. 7, the data 303 and 304 carry the values of the selected results of sine and cosine operations. Reference numerals 321 to 324 denote multipliers; 325, an adder; and 326 a subtractor. The operations expressed in the equations (1) and (2) described in the first embodiment can be realized by the configuration shown in FIG. 7.

Thus, according to the configuration of the third embodiment, the addresses to the LUT 302 are stored in the storage unit 301 in advance, and thus the sine and cosine values for an angle corresponding to a designated address are outputted without performing sine and cosine operations, the processing speed improves.

Other Embodiment

In the first to third embodiment, the present invention is applied to an image sensing device. However, the present invention can be widely applied to cases where angular velocity detectors detect angular velocities in the two orthogonal detection axes, used together with vibration compensation devices.

Further, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as object codes, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A vibration compensation apparatus comprising:
   an angular velocity detector that detects angular velocities in vibration detection axes directions, the vibration detection axes being two orthogonal detection axes, and outputs corresponding angular velocity signals;
   a compensation unit that compensates vibration in vibration compensation axes directions, the vibration compensation axes being two orthogonal axes that make an angle with said vibration detection axes due to deviation of alignment between said angular velocity detector and said compensation unit; and
   a conversion unit that converts the angular velocity signals expressed in the vibration detection axes directions obtained by said angular velocity detector or vibration compensation signals based on the angular velocity signals into angular velocity signals or vibration compensation signals expressed in the vibration compensation axes directions using equations for rotation transformation based on said angle,
   wherein said compensation unit compensates the vibration based on the angular velocity signals or vibration compensation signals converted by said conversion unit, and said conversion unit performs the following operations:

$X = x \cos\theta - y \sin\theta$ $Y = y \cos\theta + x \sin\theta$ wherein x and y are the angular velocity signals expressed in the vibration detection axes direction or compensation signals based on the angular velocity signals, θ is said angle made by the vibration detection axes and the vibration compensation axes, and X and Y are converted signals.

2. The vibration compensation apparatus according to claim 1, wherein said conversion unit has a conversion table storing angular velocity signal values or vibration compensation signal values expressed in the vibration detection axes directions to be used in the conversion operation in accordance with angular velocity signals or vibration compensation signals expressed in the vibration compensation axes directions.

3. The vibration compensation apparatus according to claim 1, wherein said compensation unit comprises an optical compensation unit.

4. An image sensing apparatus comprising:
   a photoelectric converter that senses an image by converting incident light into an electric signal; and
   the vibration compensation apparatus according to claim 1, wherein said compensation unit compensates vibration by controlling read out timing of the electric signal from said photoelectric converter.

5. An image sensing apparatus comprising:
   an photoelectric converter that senses an image by converting incident light into an electric signal; and
   the vibration compensation apparatus according to claim 1, wherein said compensation unit compensates vibration by processing the electric signal outputted from said photoelectric converter.

6. A vibration compensation method using an angular velocity detector which detects angular velocities in vibration detection axes directions, the vibration detection axes being two orthogonal detection axes, and outputs angular velocity signals, and a compensation unit which compensates vibration in vibration compensation axes directions, the vibration compensation axes being two orthogonal axes that make an angle with said vibration detection axes due to deviation of alignment between said angular velocity detector and said compensation unit, comprising:
   converting the angular velocity signals expressed in the vibration detection axes directions obtained by said angular velocity detector or vibration compensation signals based on the angular velocity signals into angular velocity signals or vibration compensation signals expressed in the vibration compensation axes directions using equations for rotation transformation based on said angle; and
   compensating the vibration by controlling the compensation unit based on the converted angular velocity signals or vibration compensation signals,
   wherein converting said angular velocity signals includes performing the following operations:

$X = x \cos\theta - y \sin\theta$ $Y = y \cos\theta + x \sin\theta$ wherein x and y are the angular velocity signals expressed in the vibration detection axes direction or compensation signals based on the angular velocity signals, θ is said angle made by the vibration detection axes and the vibration compensation axes, and X and Y are converted signals.

7. A storage medium, readable by an information processing apparatus, storing a program including program codes capable of realizing the vibration compensation method according to claim 6, the program being executable by the information processing apparatus.

* * * * *